(12) United States Patent
Gornard

(10) Patent No.: US 11,535,742 B2
(45) Date of Patent: Dec. 27, 2022

(54) POLYMER COMPOSITION COMPRISING A BRANCHED THERMOPLASTIC ELASTOMER AND A THERMOPLASTIC STYRENE POLYMER

(71) Applicant: COMPAGNIE GENERALE DES ETABLISSEMENTS MICHELIN, Clermont-Ferrand (FR)

(72) Inventor: Benjamin Gornard, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 452 days.

(21) Appl. No.: 16/625,017

(22) PCT Filed: Jun. 19, 2018

(86) PCT No.: PCT/EP2018/066197
§ 371 (c)(1),
(2) Date: Dec. 20, 2019

(87) PCT Pub. No.: WO2018/234278
PCT Pub. Date: Dec. 27, 2018

(65) Prior Publication Data
US 2020/0148877 A1 May 14, 2020

(30) Foreign Application Priority Data
Jun. 21, 2017 (FR) ........................ 1755659

(51) Int. Cl.
*C08L 53/02* (2006.01)
*B60C 1/00* (2006.01)
*C08J 3/24* (2006.01)

(52) U.S. Cl.
CPC ............ *C08L 53/02* (2013.01); *B60C 1/0016* (2013.01); *C08J 3/24* (2013.01); *C08J 2353/00* (2013.01); *C08J 2425/06* (2013.01)

(58) Field of Classification Search
CPC ......... C08L 53/02; C08L 53/025; C08L 25/06
See application file for complete search history.

(56) References Cited

U.S. PATENT DOCUMENTS

| 5,036,130 A | 7/1991 | Walter et al. |
| 7,250,463 B2 | 7/2007 | Durel et al. |
| 9,849,727 B2 | 12/2017 | Abad et al. |
| 10,131,779 B2 | 11/2018 | Hamilton et al. |
| 2005/0004297 A1 | 1/2005 | Durel et al. |
| 2009/0247703 A1* | 10/2009 | Handlin, Jr. ........ C08F 297/044 525/99 |
| 2014/0076473 A1 | 3/2014 | Abad et al. |
| 2017/0198079 A1* | 7/2017 | Ohishi ................ B65D 65/40 |
| 2017/0240740 A1 | 8/2017 | Hamilton et al. |

FOREIGN PATENT DOCUMENTS

| WO | 03/016387 A1 | 2/2003 |
| WO | 2012/152686 A1 | 11/2012 |
| WO | 2016/034609 A1 | 3/2016 |
| WO | 2017/064091 A1 | 4/2017 |

OTHER PUBLICATIONS

International Search Report dated Jul. 12, 2018, in corresponding PCT/EP2018/066197 (4 pages).
P.S. Tucker, et al., "Thermal, Mechanical, and Morphological Analyses of Poly(2,6-dimetyl-1,4-phenylene oxide)/Styrene-Butadiene-Styrene Blends", Macromolecules, vol. 21, pp. 1678-1685 (1988).

* cited by examiner

*Primary Examiner* — Jeffrey C Mullis
(74) *Attorney, Agent, or Firm* — Venable LLP

(57) ABSTRACT

A polymer composition comprises (a) 50 to 100 phr of one or more branched thermoplastic elastomers each comprising an unsaturated elastomer block and at least three thermoplastic styrene blocks, the thermoplastic styrene blocks of each branched thermoplastic elastomer representing from 15% to 75%, preferably from 15% to 50%, by weight of the weight of each branched thermoplastic elastomer, and (b) 10 to 100 phr of one or more thermoplastic styrene polymers having a molecular mass of between 25,000 and 300,000 g/mol, preferably between 50,000 and 200,000 g/mol.

19 Claims, No Drawings

POLYMER COMPOSITION COMPRISING A BRANCHED THERMOPLASTIC ELASTOMER AND A THERMOPLASTIC STYRENE POLYMER

BACKGROUND

The present invention relates to a polymer composition comprising a particular thermoplastic styrene elastomer and a particular thermoplastic styrene polymer, and also to a tyre comprising layers or portions formed of such a composition, it being possible for said layers or portions to be in particular all or part of a tread.

In a conventional tyre, the tread generally comprises, predominantly by weight, one or more diene elastomers.

A constant aim of tyre manufacturers is to improve the wet grip of tyres. At the same time, another aim is to reduce the rolling resistance of tyres. However, these two aims are difficult to reconcile in that the improvement in grip implies increasing the hysteresis losses whereas the improvement in the rolling resistance implies lowering the hysteresis losses. There is therefore a compromise in performance to be optimized.

Consequently, the applicant companies previously developed tyres equipped with a tread comprising a thermoplastic elastomer. These tyres have a very good compromise in grip and rolling resistance performance.

But the stiffness at ambient temperature of the treads may still be improved.

Furthermore, the treads made of thermoplastic elastomers have an easier processing due to a low viscosity at temperature.

However, on the finished tyre, it may be that the low stiffness at high temperature that is desired for the processing is then a problem for the performance of the tyre, in particular during use at high temperature. Specifically, during tyre use cycles such as braking cycles, this may result, in extreme cases, in a softening of the tread which would have the consequence of reducing the endurance of the tread.

Thus, the temperature resistance performance of the treads may still be improved.

Consequently, there is a need to improve the temperature resistance of thermoplastic elastomer treads, i.e. to limit the drop in stiffness when the temperature increases, without degrading the processability of these treads.

Furthermore, it is advantageous for the tread to have good mechanical properties, in particular in terms of stiffness for a given elongation at break.

Finally, the formulations of the elastomer compositions are often complex in order to impart a certain stiffness. There is therefore also a need to simplify these formulae.

The applicant companies have now discovered, unexpectedly, that a polymer composition comprising
a) 50 to 100 phr of one or more branched thermoplastic elastomers each comprising an unsaturated elastomer block and at least three thermoplastic styrene blocks, the thermoplastic styrene blocks of each branched thermoplastic elastomer representing from 15% to 75%, preferably from 15% to 50%, by weight of the weight of each branched thermoplastic elastomer,
b) 10 to 100 phr of one or more thermoplastic styrene polymers having a molecular mass of between 25 000 and 300 000 g/mol, preferably between 50 000 and 200 000 g/mol
made it possible to respond to the constraints formulated above, namely improving the stiffness at ambient temperature, thermal stability, improving the mechanical properties and simplifying the formulation.

SUMMARY

Thus, one subject of the invention is a polymer composition comprising
a) 50 to 100 phr of one or more branched thermoplastic elastomers each comprising an unsaturated elastomer block and at least three thermoplastic styrene blocks, the thermoplastic styrene blocks of each branched thermoplastic elastomer representing from 15% to 75%, preferably from 15% to 50%, by weight of the weight of each branched thermoplastic elastomer,
b) 10 to 100 phr of a thermoplastic styrene polymer having a molecular mass of between 25 000 and 300 000 g/mol, preferably between 50 000 and 200 000 g/mol.

DETAILED DESCRIPTION

In the present invention, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present application, the term "parts per hundred of elastomer" or "phr" is intended to mean the part by weight of a constituent per 100 parts by weight of the elastomer(s) of the elastomer matrix, i.e. of the total weight of the elastomer(s), whether they are thermoplastic or non-thermoplastic, present in the elastomeric matrix. Thus, a constituent at 60 phr will mean, for example, 60 g of this constituent per 100 g of elastomer of the elastomeric matrix.

The term "thermoplastic elastomer (TPE)" is intended to mean, in a known manner, a polymer with a structure that is intermediate between a thermoplastic polymer and an elastomer.

A thermoplastic elastomer generally consists of one or more rigid "thermoplastic" segments connected to one or more flexible "elastomer" segments.

The branched thermoplastic elastomer(s) present in the composition according to the invention thus consist of a flexible "elastomer" segment and at least three rigid "thermoplastic" segments.

Thus, the branched thermoplastic elastomer(s) of the composition according to the invention comprise an elastomer block and at least three thermoplastic blocks.

Typically, each of these segments or blocks contains at least more than 5, generally more than 10, base units.

In the present application, when reference is made to the glass transition temperature of a thermoplastic elastomer, it is the glass transition temperature relating to the elastomer block (unless otherwise indicated). Indeed, in a known manner, thermoplastic elastomers have two glass transition temperature peaks (Tg, measured according to ASTM D3418), the lowest temperature being related to the elastomer part of the thermoplastic elastomer and the highest temperature being related to the thermoplastic part of the thermoplastic elastomer. Thus, the flexible blocks of the thermoplastic elastomers are generally defined by a Tg below or equal to ambient temperature (25° C.), whilst the rigid blocks have a Tg above or equal to 80° C. In order to be of both elastomeric and thermoplastic nature, the thermoplastic elastomer must be provided with blocks that are sufficiently incompatible (that is to say different due to their respective mass, their respective polarity or their respective Tg) in order to retain their characteristic elastomer block or thermoplastic block properties.

Thus, the thermoplastic elastomer(s) that can be used according to the invention (therefore the elastomer block(s) of the thermoplastic elastomers) preferentially have a glass transition temperature which is below or equal to 25° C., more preferentially below or equal to 10° C. A Tg value above these minima may reduce the performances of the tread during use at very low temperature; for such a use, the glass transition temperature of the thermoplastic elastomers is more preferentially still below or equal to −10° C.

Also preferentially, the glass transition temperature of the thermoplastic elastomers that can be used according to the invention is above −100° C.

The number-average molecular mass (denoted by Mn) of the thermoplastic elastomers is preferentially between 30 000 and 500 000 g/mol, more preferentially between 40 000 and 400 000 g/mol. Below the minima indicated, there is a risk of the cohesion between the elastomer chains of the thermoplastic elastomers being affected, in particular due to their possible dilution (in the presence of an extender oil); furthermore, there is a risk of an increase in the working temperature affecting the mechanical properties, in particular the properties at break, with the consequence of a reduced "hot" performance. Furthermore, an excessively high Mn mass can be detrimental to the processability. Thus, it has been found that a value between 50 000 and 300 000 g/mol was particularly well suited to use of the thermoplastic elastomers in a tyre tread.

The number-average molecular mass (Mn) and the weight-average molecular mass (Mw) of the thermoplastic elastomers are determined in a known manner, by size exclusion chromatography (SEC). The sample is first dissolved in a suitable solvent at a concentration of about 2 g/l and then the solution is filtered through a filter with a porosity of 0.45 μm before injection. The apparatus used is a Waters Alliance chromatographic line. The injected volume of the solution of the polymer sample is 100 μl. The detector is a Waters 2410 differential refractometer and its associated software, for processing the chromatographic data, is the Empower system. The conditions can be adjusted by those skilled in the art. For example, in the case of thermoplastic styrene elastomers, the sample is first dissolved in tetrahydrofuran to a concentration of about 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analysis time is 90 min. A set of four Waters Styragel columns (an HMW7 column, an HMW6E column and two HT6E columns) are used in series. The injected volume of the solution of the polymer sample is 100 μl. The detector is a Waters 2410 differential refractometer and its associated software, for processing the chromatographic data, is the Waters Millennium system. The calculated average molar masses are relative to a calibration curve produced with polystyrene standards.

The polydispersity index (PI=Mw/Mn, with Mw the weight-average molecular mass) of the thermoplastic elastomer(s) is preferably less than 3; more preferentially less than 2 and more preferentially still less than 1.5.

The branched thermoplastic elastomers that can be used according to the invention preferably each comprise in total less than 10 (elastomeric and thermoplastic) blocks, preferably from 4 to 8, more preferably from 4 to 5.

Preferably, the blocks of the branched thermoplastic elastomers that can be used according to the invention have masses, preferably weight-average molecular masses (Mw), of greater than 2000 g/mol, preferably of greater than 5000 g/mol, more preferably greater than 10 000 g/mol.

The thermoplastic elastomers present in the composition according to the invention are in a branched form. These branched thermoplastic elastomers can then be composed of a branched elastomer block and of thermoplastic blocks located at the end of each of the branches of the elastomer block.

According to a particular embodiment, the branched thermoplastic elastomer(s) that can be used according to the invention are in a star-branched form comprising at least three branches.

For example, the thermoplastic elastomers can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to another particular embodiment, the branched thermoplastic elastomers that can be used according to the invention are in a dendrimer form.

Thus, according to this embodiment, the thermoplastic elastomers can be composed of a dendrimer elastomer block and of thermoplastic blocks located at the end of each of the branches of the elastomer block. A dendrimer elastomer block is understood to mean an elastomer block having at least two branches, each branch itself dividing into at least two sub-branches, it being possible for such a division to be repeated over several generations, like the branches of a tree.

As explained above, the branched thermoplastic elastomer(s) present in the composition according to the invention comprise at least one unsaturated elastomer block and at least three thermoplastic blocks.

The term "unsaturated elastomer block" is intended to mean that this block is at least partially derived from conjugated diene monomers, having a content of moieties or units of diene origin (conjugated dienes) which is greater than 15 mol %.

Reference may then also be made to an "essentially unsaturated" elastomer block.

A "highly unsaturated" elastomer block is also intended to mean an elastomer block having a content of moieties of diene origin (conjugated dienes) which is greater than 50 mol %.

The unsaturated elastomer blocks that can be used according to the invention may be selected from:

a) any homopolymer obtained by polymerization of a conjugated diene monomer having from 4 to 12 carbon atoms;

b) any copolymer obtained by copolymerization of one or more conjugated dienes with one another or with one or more vinylaromatic compounds having from 8 to 20 carbon atoms;

c) a ternary copolymer obtained by copolymerization of ethylene and an α-olefin having from 3 to 6 carbon atoms with an unconjugated diene monomer having from 6 to 12 carbon atoms, such as, for example, the elastomers obtained from ethylene and propylene with an unconjugated diene monomer of the abovementioned type, such as, especially, 1,4-hexadiene, ethylidenenorbornene or dicyclopentadiene;

d) a copolymer of isobutene and of isoprene (diene butyl rubber) and also the halogenated versions, in particular chlorinated or brominated versions, of this type of copolymer.

Conjugated dienes that are suitable are in particular isoprene, 1,3-butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene, and a mixture of these conjugated dienes; preferably these conjugated dienes are selected from isoprene, butadiene and a mixture containing isoprene and/or butadiene.

According to one variant, the monomers polymerized in order to form an unsaturated elastomer block may be copolymerized, randomly, with at least one other monomer so as to form an unsaturated elastomer block. According to this variant, the molar fraction of polymerized monomer, other than a diene monomer, relative to the total number of moieties of the unsaturated elastomer block, has to be such that this block retains its unsaturated elastomer properties. Advantageously, the molar fraction of this other comonomer can range from 0 to 50%, more preferentially from 0 to 45% and more preferentially still from 0 to 40%.

By way of illustration, this other monomer capable of copolymerizing with the first monomer can be selected from ethylenic monomers, such as ethylene, propylene or butylene, monomers of vinylaromatic type having from 8 to 20 carbon atoms as defined below, or else it may be a monomer such as vinyl acetate.

Styrene monomers, namely methylstyrenes, para-(tert-butyl)styrene, chlorostyrenes, bromostyrenes, fluorostyrenes or else para-hydroxystyrene, are suitable in particular as vinylaromatic compounds. Preferably, the comonomer of vinylaromatic type is styrene.

Thus, according to one embodiment, the elastomer block may be a random copolymer of styrene-butadiene (SBR) type, it being possible for this copolymer to be partially hydrogenated. This SBR block preferably has a Tg (glass transition temperature) measured by DSC according to standard ASTM D3418 of 1999, below 25° C., preferentially below 10° C., more preferentially below 0° C. and very preferentially below −10° C. Also preferentially, the Tg of the SBR block is above −100° C. SBR blocks having a Tg of between 20° C. and −70° C., and more particularly between 0° C. and −50° C., are especially suitable. In a well-known manner, the SBR block comprises a styrene content, a content of 1,2-bonds of the butadiene part and a content of 1,4-bonds of the butadiene part, the latter being composed of a content of trans-1,4-bonds and a content of cis-1,4-bonds when the butadiene part is not hydrogenated. Preferentially, use is especially made of an SBR block having a styrene content for example within a range extending from 10% to 60% by weight, preferably from 20% to 50% by weight, and, for the butadiene part, a content of 1,2-bonds within a range extending from 4% to 75% (mol %) and a content of 1,4-bonds within a range extending from 20% to 96% (mol %).

The degree of hydrogenation is determined by an NMR analysis. The spectra are acquired on a Bruker Avance 500 MHz spectrometer equipped with a 1H-X 5 mm Cryoprobe. The quantitative $^1$H NMR experiment uses a simple 30° pulse sequence and a repetition time of 5 seconds between each acquisition. 64 accumulations are carried out. The samples (approximately 25 mg) are dissolved in approximately 1 ml of $CS_2$, 100 µl of deuterated cyclohexane are added for locking during acquisition. The chemical shifts are calibrated relative to the protonated impurity of the $CS_2$ 1H δ ppm at 7.18 ppm, with reference to TMS (1H δ ppm at 0 ppm). The $^1$H NMR spectrum makes it possible to quantify the microstructure by integration of the unresolved peaks of signals characteristic of the different moieties:

The styrene originating from the SBR and the polystyrene blocks. It is quantifiable in the aromatics region between 6.0 ppm and 7.3 ppm for 5 protons (with subtraction of the integral of the signal of the $CS_2$ impurity at 7.18 ppm).

The PB1-2 originating from the SBR. It is quantifiable in the ethylenics region between 4.6 ppm and 5.1 ppm for 2 protons.

The PB1-4 originating from the SBR. It is quantifiable in the ethylenics region between 5.1 ppm and 6.1 ppm for 2 protons and with deletion of 1 proton of the PB1-2 moiety.

The hydrogenated PB1-2 originating from the hydrogenation and only exhibiting aliphatic protons. The pendent $CH_3$s of the hydrogenated PB1-2 were identified and are quantifiable in the aliphatics region between 0.4 and 0.8 ppm for 3 protons.

The hydrogenated PB1-4 originating from the hydrogenation and only exhibiting aliphatic protons. It will be deduced by subtracting the aliphatic protons of the various moieties, considering it for 8 protons.

The microstructure can be quantified in mol % as follows: mol % of a moiety=$^1$H integral of a moiety/Σ($^1$H integrals of each moiety). For example, for a styrene moiety: mol % of styrene=($^1$H integral of styrene)/($^1$H integral of styrene+$^1$H integral of PB1-2+$^1$H integral of PB1-4+$^1$H integral of hydrogenated PB1-2+$^1$H integral of hydrogenated PB1-4).

Preferably, in the thermoplastic elastomers of use for the requirements of the invention, the SBR elastomer block is hydrogenated such that a proportion ranging from 10 mol % to 80 mol % of the double bonds in the butadiene portion are hydrogenated. Preferably for the invention, the elastomer blocks of the branched thermoplastic elastomers have, in total, a number-average molecular mass (Mn) ranging from 25 000 g/mol to 350 000 g/mol, preferably from 35 000 g/mol to 250 000 g/mol, so as to confer on the thermoplastic elastomers good elastomeric properties and a mechanical strength which is sufficient and compatible with the use as tyre tread.

Preferably in the invention, the unsaturated elastomer block is selected from the group consisting of polyisoprenes, polybutadienes, butadiene/isoprene copolymers, styrene/butadiene copolymers, and mixtures of these elastomers, these elastomers being non-hydrogenated or partially hydrogenated.

Particular preferably, the unsaturated elastomer block is selected from polybutadienes.

As explained above, the branched thermoplastic elastomers present in the composition according to the invention also comprise at least three thermoplastic styrene blocks.

The term "thermoplastic block" is intended to mean a block consisting of polymerized monomers and having a glass transition temperature, or a melting point in the case of semicrystalline polymers, above or equal to 80° C., preferably varying from 80° C. to 250° C., more preferentially varying from 80° C. to 200° C., and in particular varying from 80° C. to 180° C.

Indeed, in the case of a semicrystalline polymer, a melting point may be observed which is above the glass transition temperature. In this case, the melting point and not the glass transition temperature is taken into account for the definition above.

The term "thermoplastic styrene block" is intended to mean a thermoplastic block comprising units derived from one or more styrene monomers.

Preferably, the thermoplastic styrene blocks each consist of more than 75% by weight, preferably of more than 85% by weight, more preferably of more than 95% by weight, better still of 100% by weight, relative to the weight of the thermoplastic styrene block, of units derived from one or more styrene monomers.

Preferably, the styrene monomer(s) are selected from styrene, o-, m- or p-methylstyrene, alpha-methylstyrene, beta-methylstyrene, 2,6-dimethylstyrene, 2,4-dimethylstyrene, alpha-methyl-o-methylstyrene, alpha-methyl-m-methylstyrene, alpha-methyl-p-methylstyrene, beta-methyl-o-methylstyrene, beta-methyl-m-methylstyrene, beta-methyl-p-methylstyrene, 2,4,6-trimethylstyrene, alpha-methyl-2,6-dimethylstyrene, alpha-methyl-2,4-dimethylstyrene, beta-methyl-2,6-dimethylstyrene, beta-methyl-2,4-dimethylstyrene, o-, m- or p-chlorostyrene, 2,6-dichlorostyrene, 2,4-dichlorostyrene, alpha-chloro-o-chlorostyrene, alpha-chloro-m-chlorostyrene, alpha-chloro-p-chlorostyrene, beta-chloro-o-chlorostyrene, beta-chloro-m-chlorostyrene, beta-chloro-p-chlorostyrene, 2,4,6-trichlorostyrene, alpha-chloro-2,6-dichlorostyrene, alpha-chloro-2,4-dichlorostyrene, beta-chloro-2,6-dichlorostyrene, beta-chloro-2,4-dichlorostyrene, o-, m- or p-butylstyrene, o-, m- or p-methoxystyrene, o-, m- or p-chloromethylstyrene, o-, m- or p-bromomethylstyrene, styrene derivatives substituted with a silyl group, and mixtures of these monomers.

Very particularly preferably, the styrene monomer(s) are selected from styrene, alpha-methylstyrene, and mixtures of these monomers, and more preferentially the styrene monomer is styrene.

Advantageously, the thermoplastic styrene blocks of each branched thermoplastic elastomer of the composition according to the invention represent from 20% to 50%, preferably from 20% to 40%, by weight of the weight of each branched thermoplastic elastomer.

As explained above, the composition according to the invention comprises 50 to 100 phr of the branched thermoplastic elastomer(s) as described above.

Preferably, said thermoplastic elastomer(s) represent from 70 to 100 phr, preferably from 80 to 100 phr, of the composition according to the invention.

Besides the branched thermoplastic elastomer(s) as defined above, the composition according to the invention may contain other elastomers, such as diene elastomers or non-branched and/or non-styrene thermoplastic elastomers, representing from 0 to 50 phr, preferably from 0 to 30 phr, more preferably from 0 to 20 phr.

It is also possible for the composition according to the invention to comprise one or more non-thermoplastic elastomers.

Preferably, the branched thermoplastic elastomer(s) as defined above are the only elastomers of the composition. In other words, the branched thermoplastic elastomer(s) defined above, according to this preferred embodiment, represent 100 phr of the polymer composition according to the invention.

As explained above, the polymer composition according to the invention comprises 10 to 100 phr of one or more thermoplastic styrene polymers having a molecular mass, preferably a weight-average molecular mass (Mw), of between 25 000 and 300 000 g/mol, preferably of between 50 000 and 200 000 g/mol.

The term "thermoplastic polymer" is intended to mean a thermoplastic polymer having a glass transition temperature, or a melting point in the case of semicrystalline polymers, above or equal to 80° C., preferably varying from 80° C. to 250° C., more preferentially varying from 80° C. to 200° C., and in particular varying from 80° C. to 180° C.

Indeed, in the case of a semicrystalline polymer, a melting point may be observed which is above the glass transition temperature. In this case, the melting point and not the glass transition temperature is taken into account for the definition above.

It is clear that a thermoplastic polymer within the meaning of the present invention is not a thermoplastic elastomer.

The term "thermoplastic styrene polymer" is intended to mean a thermoplastic polymer comprising units derived from one or more styrene monomers.

An average molecular mass of a thermoplastic styrene polymer is understood preferentially to mean the weight-average molecular mass.

Preferably, the thermoplastic styrene polymer(s) consist of more than 75% by weight, preferably of more than 85% by weight, more preferably of more than 95% by weight, better still of 100% by weight, of units derived from one or more styrene monomers.

The styrene monomer(s) that can be used for the thermoplastic polymer(s) may be selected from the styrene monomers that can be used for the thermoplastic styrene blocks of the branch thermoplastic elastomer(s) present in the polymer composition according to the invention and cited above.

Very particularly preferably, the styrene monomer(s) are selected from styrene, alpha-methylstyrene, and mixtures of these monomers, and more preferentially the styrene monomer is styrene.

Preferably, said thermoplastic styrene polymer(s) represent from 15 to 85 phr of the composition according to the invention.

According to a first particular embodiment, said thermoplastic styrene polymer(s) that can be used in the composition according to the invention represent from 50 to 85 phr of the composition according to the invention and have a molecular mass, preferably an Mw, of between 50 000 and 100 000 g/mol.

According to a second particular embodiment, said thermoplastic styrene polymer(s) that can be used in the composition according to the invention represent from 15 to 50 phr of the composition according to the invention and have a molecular mass, preferably an Mw, of between 120 000 and 200 000 g/mol.

The composition according to the invention may optionally comprise one or more thermoplastic polymers other than the thermoplastic styrene polymers described above.

When are present in the composition, the thermoplastic non-styrene polymers preferably represent less than 30 phr, preferably between 10 and 25 phr.

These thermoplastic non-styrene polymers may in particular be poly(para-phenylene ether) polymers (denoted by the abbreviation "PPE"). These PPE thermoplastic polymers are well known to a person skilled in the art; they are resins which are solid at ambient temperature (20° C.) and are compatible with styrene polymers, which are in particular used to increase the glass transition temperature of thermoplastic elastomers, the thermoplastic block of which is a styrene block (see, for example, "Thermal, Mechanical and Morphological Analyses of Poly(2,6-dimethyl-1,4-phenylene oxide)/Styrene-Butadiene-Styrene Blends", Tucker, Barlow and Paul, Macromolecules, 1988, 21, 1678-1685).

Preferably, the composition does not comprise any thermoplastic non-styrene polymer.

The composition according to the invention may comprise a crosslinking system.

When the composition comprises one, the crosslinking system can in particular be a "vulcanization" system, that is to say a system based on sulfur (or on a sulfur donor) and on a vulcanization accelerator. Various known secondary vulcanization accelerators or vulcanization activators, such as stearic acid, zinc oxide, guanidine derivatives, retarders or antireversion agents, can be added to this base vulcanization system.

The crosslinking system may also be based on one or more peroxides.

The expression "based on" should be understood to mean that the crosslinking system comprises a mixture and/or the reaction product of the various constituents used in the crosslinking system, and in particular the peroxide(s), some of these base constituents being capable of reacting, or intended to react, with one another or with the other constituents of the composition, at least in part, during the various phases of manufacture of the composition, in particular during the crosslinking thereof.

The peroxide(s) that can be used according to the invention may be any peroxides known to those skilled in the art.

Preferably, the peroxide(s) that can be used according to the invention are selected from organic peroxides.

Particularly preferably, the peroxide(s) that can be used according to the invention are selected from dialkyl peroxides such as di-tert-butyl peroxide (DTBP); dicumyl peroxide; tert-butylcumyl peroxide and 2,5-dimethyl-2,5-di(tert-butylperoxy)hexane (DBPH), diacyl peroxides such as bis(2,4-dichlorobenzoyl) peroxide (DCBP-50) and benzoyl peroxide (BP-50), acetal peroxides such as ethyl 3,3-di(t-butylperoxy)butyrate), ester peroxides such as t-butyl peroxybenzoate and 00-(t-butyl)O-(2-ethylhexyl) monoperoxycarbonate, hydroperoxides such as t-amyl hydroperoxide, and the mixtures of these compounds.

The composition may also be crosslinked by means of electron bombardment.

Preferably, this electron bombardment is carried out by means of beta radiation.

Thus, preferably, the composition according to the invention is crosslinked by means of electron bombardment at an exposure level of at least 50 kGy, preferably ranging from 70 to 300 kGy.

Preferably, the polymer composition according to the invention does not comprise a crosslinking system.

The polymer composition according to the invention may also comprise one or more reinforcing fillers.

In particular, use may be made of any type of filler commonly used for the manufacture of tyres, for example an organic filler, such as carbon black, an inorganic filler, such as silica, or else a blend of these two types of filler, especially a blend of carbon black and silica.

Any carbon black conventionally used in tyres ("tyre-grade" blacks) are suitable for use as carbon blacks. Mention will more particularly be made, for example, of the reinforcing carbon blacks of the 100, 200 or 300 series (ASTI grades), such as, for example, the N115, N134, N234, N326, N330, N339, N347 or N375 blacks, or else, depending on the applications targeted, the blacks of higher series (for example N660, N683 or N772), indeed even N990.

"Reinforcing inorganic filler" should be understood, in the present patent application, by definition, as meaning any inorganic or mineral filler (whatever its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, reinforcing inorganic filler is also understood to mean mixtures of different reinforcing inorganic fillers, in particular of highly dispersible siliceous and/or aluminous fillers, such as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica having a BET surface area and a CTAB specific surface area both of less than 450 $m^2$/g, preferably from 30 to 400 $m^2$/g. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Solvay, the Hi-Sil EZ150G silica from PPG, the Zeopol 8715, 8745 and 8755 silicas from Huber or the silicas with a high specific surface area as described in application WO 03/16837.

In order to couple the reinforcing inorganic filler to the thermoplastic elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

The content by volume of optional reinforcing filler in the composition (carbon black and/or reinforcing inorganic filler, such as silica) is within a range extending from 0 to 30%, which corresponds approximately to a content of 0 to 100 phr for a plasticizer-free composition. Preferentially, the composition according to the invention comprises less than 30 phr of reinforcing filler and more preferentially less than 10 phr.

According to a preferential variant of the invention, the composition does not contain reinforcing filler.

In the same way, the composition according to the invention may contain one or more inert micrometric fillers, such as the platy fillers known to a person skilled in the art.

Preferably, the composition according to the invention does not contain a micrometric filler.

The composition according to the invention may furthermore comprise the various additives known to a person skilled in the art. For example, one or more additives selected from protective agents, such as antioxidants or antiozonants, UV stabilizers, the various processing aids or other stabilizers, and non-reinforcing fillers, will be chosen.

Preferentially, the composition according to the invention does not contain any of these additives.

A further subject of the present invention is a tyre comprising at least one layer consisting of a polymer composition as defined above.

A layer is understood, for the purposes of the present invention, to mean a strip or any other three-dimensional element having a relatively small thickness with respect to its other dimensions, for which the ratio of the thickness to the largest of the other dimensions is less than 0.5, preferably less than 0.1.

Preferably, the layer is all or part of a tread.

A final subject of the present invention is a tyre comprising a tread comprising a polymer composition as defined above in all or part of its tread.

The tread may be mounted on a tyre in a conventional manner, said tyre comprising, in addition to the tread, a crown, two sidewalls and two beads, a carcass reinforcement anchored to the two beads, and a crown reinforcement.

Optionally, the tyre according to the invention may further comprise an underlayer or an adhesion layer between the patterned portion of the tread and the crown reinforcement.

In general, the tyre according to the invention is intended to equip motor vehicles of passenger vehicle, SUV ("Sports Utility Vehicle"), two-wheel vehicle (especially motorcycle) or aircraft type, and also industrial vehicles such as vans, heavy-duty vehicles and other transportation or handling vehicles.

Heavy-duty vehicles may especially comprise underground trains, buses and heavy road transport vehicles such as lorries, tractors, trailers and off-road vehicles, such as heavy agricultural or construction plant vehicles.

The process for preparing a tyre as defined above generally comprises the following steps:

extruding or co-extruding the tread, then placing the extruded tread on the tyre, then curing the tyre.

Thus, the tread of the tyre according to the invention is firstly prepared in the conventional way, by incorporation of the various components in a twin-screw extruder, so as to melt the matrix and incorporate all the ingredients, followed by use of a die which makes it possible to produce the profiled element.

The various components of the tread are in particular the thermoplastic elastomers seen above which are available for example in the form of beads or granules.

The tread is then placed on the tyre.

The tyre is then cured. The tread is then generally patterned in the mould for curing the tyre.

Examples

Tensile Tests

These tensile tests make it possible to determine the moduli of elasticity and the properties at break and are based on French standard NF T 46-002 of September 1988. Processing the tensile recordings also makes it possible to plot the curve of modulus as a function of the elongation. The modulus used here is the true secant modulus measured in first elongation, calculated by normalizing to the initial cross section of the test specimen. The true secant moduli (or true stresses, in MPa) are measured in first elongation, at 23° C.±2° C., at 10% elongation denoted TSM10.

G* Moduli Measurements

The dynamic complex modulus G* is measured on a viscosity analyser (Metravib V A4000). The response of a sample of a composition (cylindrical test specimen with a thickness of 4 mm and a cross section of 400 mm$^2$), subjected to a simple alternating sinusoidal shear stress, with an imposed stress of 0.7 MPa at a frequency of 10 Hz, as a function of the temperature according to the ASTM D 1349-99 standard, is recorded. The values of the G* modulus at 23° C. and 80° C. are noted in particular.

Preparation of the Compositions

The following compositions are prepared. The formulations are given in Table 1 and are expressed in phr, SBS being considered here to be an elastomer in its entirety.

Composition A0 is a reference composition, with the customary means for obtaining high-modulus elastomer mixtures.

Composition C0 is given by way of comparison since it comprises a linear SBS.

Compositions C1 and C2 are in accordance with the invention (star-branched SBS+PS).

Similarly, composition C3 is given by way of comparison since it comprises a PS having a molecular mass of less than 25 000 g/mol.

Finally, compositions C4 and C5 are in accordance with the present invention.

TABLE 1

| Compositions | A0 | C0 | C1 | C2 | C3 | C4 | C5 |
|---|---|---|---|---|---|---|---|
| Linear SBS (a) | | 100 | | | | | |
| Star-branched SBS (b) | | | 100 | 100 | 100 | 100 | 100 |
| Low-weight polystyrene (c) | | | | | 76 | | |
| Medium-weight polystyrene (d) | | 22 | 22 | | | 76 | |
| High-weight polystyrene (e) | | | | 22 | | | 76 |
| NR (f) | 100 | | | | | | |
| Carbon black (g) | 75 | | | | | | |
| Paraffinic oil (i) | 3 | | | | | | |
| Rosin (j) | 2 | | | | | | |
| Diphenylolpropane (k) | 7 | | | | | | |
| Phenol-formaldehyde resin (h) | 5 | | | | | | |
| Cobalt resinate (l) | 3 | | | | | | |
| Hexamethoxymethylmelamine (m) | 6 | | | | | | |
| ZnO (n) | 9 | | | | | | |
| Stearic acid (o) | 1 | | | | | | |
| 6PPD (p) | 2 | | | | | | |
| HMT (q) | 3 | | | | | | |
| Sulfur | 5 | | | | | | |
| CBS (r) | 1 | | | | | | |

(a) Linear SBS copolymer comprising 30% polystyrene, Kraton D1101 (Mw = 110 000 g/mol)

(b) Star-branched SBS copolymer comprising 31% polystyrene, Kraton D1184 (Mw=200 000 g/mol)
(c) Polystyrene with Mw of 1200 g/mol: Scientific Polymer
(d) Polystyrene with Mw of 35 000 g/mol: Sigma Aldrich
(e) Polystyrene with Mw of 192 000 g/mol: Sigma Aldrich
(f) Natural rubber
(g) Carbon black N326 (name according to standard ASTM D-1765)
(h) Phenol-formaldehyde novolac resin (Peracit 4536K from Perstorp)
(i) Paraffinic oil (Tudalen 1968—Klaus, Dahkele)
(j) Rosin (from Sigma Aldrich)
(k) Diphenylolproprane (from Chimprom)
(l) Cobalt resinate (from Pfaltz and Bauer)
(m) Hexamethoxymethylmelamine (Westco HMM from Western Reserve Chemical)
(n) Zinc oxide (industrial grade—Umicore)
(o) Stearin (Pristerene 4931 from Uniqema)
(p) N-(1,3-dimethylbutyl)-N-phenylparaphenylenediamine (Santoflex 6-PPD from Flexsys)
(q) Hexamethylenetetramine (from Degussa)
(r) N-cyclohexylbenzothiazolesulfenamide (Santocure CBS from Flexsys).

The mixtures are produced in an internal mixer, according to the procedure indicated below:

| Temperature | Actions |
| --- | --- |
| 90° C. | Introduction of TPS |
| 100° C. | Introduction of polystyrene |
| 105° C. | Ram stroke |
| 115° C. | Ram stroke |
| 125° C. | Dropping of the mixture |

Once the mixtures have been obtained and have dropped, shaping in a press is carried out in order to be able to characterize them.
Temperature: 130° C.
Time: around 1 min
Pressure: around 30 bar 1. Dynamic Properties The mixtures are characterized in terms of dynamic properties. Table 2 illustrates both the values of the G* moduli achieved and also the maintaining thereof at temperature for the compositions according to the invention C1, C2, C4 and C5.

TABLE 2

| Composition | G* 23° C. (MPa) | G* 80° C. (MPa) | Ratio (%) (G*80° C./G*23° C.) |
| --- | --- | --- | --- |
| A0 | 27.3 | 19 | 69.6 |
| C0 | 7.9 | 1.5 | 19.0 |
| C1 | 45.1 | 17.8 | 39.5 |
| C2 | 38.8 | 23.6 | 60.8 |
| C3 | 76.1 | 1.18 | 1.6 |
| C4 | 120 | 29 | 24.2 |
| C5 | 183 | 121 | 66.1 |

It is thus noted, by comparing the modulus levels of the composition C1 (star-branched SBS) with respect to the composition C0 (linear SBS) that these levels are much higher and that the thermal stability (G*(80° C.)/G*(23° C.) ratio) is improved.

This improvement in modulus and thermal stability (offset drop at a higher temperature, which results in a higher G*(80° C.)/G*(23° C.) ratio) is even more pronounced with composition C2 (star-branched SBS with a PS of higher mass than in C0.

Likewise, a similar improvement in the modulus and thermal resistance properties of compositions C4 and C5 is observed compared to composition C3.

Thus, if the ratios of moduli between 80° C. and 23° C. are considered (temperature stability criterion), it is observed that these ratios are much higher when the polystyrene is of high mass (C2 compared to C1 or C4 and C5 compared to C3) is used. Furthermore, in these scenarios, the temperature stabilities are similar to composition A0.

2. Mechanical Properties

The same compositions are furthermore characterized in terms of mechanical properties.

The results giving the elongations at break and the true secant moduli (TSM) are presented in Table 3.

TABLE 3

| Composition | Elongation at break (%) | TSM 10% (MPa) | Elongation at break (base 100) | TSM 10% (base 100) |
| --- | --- | --- | --- | --- |
| A0 | 183 | 60.2 | 16 | 336 |
| C0 | 1110 | 17.9 | 100 | 100 |
| C1 | 1110 | 38.3 | 100 | 214 |
| C2 | 1060 | 53 | 95 | 296 |

The best temperature stability is also accompanied by better mechanical properties seen in terms of elongation. Thus, by comparing C1 to C0 (star-branched vs linear), it is noted that the stiffness (true secant modulus at low strain) is doubled for the same elongation at break.

Likewise, by comparing C2 to C1 (polystyrene of higher weight relative to the medium-weight polystyrene), it is noted that the properties are further improved (higher modulus for a virtually identical elongation at break).

Likewise, C2 has a more advantageous balance of properties than A0, with a TSM 10% of the same order but with much better elongation at break properties.

The invention claimed is:

1. A tire comprising at least one layer containing a polymer composition comprising:
   (a) 50 to 100 phr of one or more branched thermoplastic elastomers, each comprising an unsaturated elastomer block and at least three thermoplastic styrene blocks, the thermoplastic styrene blocks of each branched thermoplastic elastomer representing from 15% to 75% by weight of the weight of each branched thermoplastic elastomer; and
   (b) 10 to 100 phr of one or more thermoplastic styrene polymers having a weight-average molecular mass (Mw) of between 25,000 and 300,000 g/mol.

2. The tire according to claim 1, wherein the blocks of each branched thermoplastic elastomer have masses of greater than 2000 g/mol.

3. The tire according to claim 1, wherein each branched thermoplastic elastomer is in a star-branched form comprising at least three branches or in a dendrimer form.

4. The tire according to claim 1, wherein the unsaturated elastomer block of each branched thermoplastic elastomer is selected from the group consisting of polyisoprenes, polybutadienes, butadiene/isoprene copolymers, styrene/butadiene copolymers, and mixtures thereof, all of these elastomers being non-hydrogenated or partially hydrogenated.

5. The tire according to claim 1, wherein the unsaturated elastomer block of each branched thermoplastic elastomer is selected from polybutadienes.

6. The tire according to claim 1, wherein the thermoplastic styrene blocks of each branched thermoplastic elastomer each consist of more than 75% by weight relative to the weight of the thermoplastic styrene block of units derived from one or more styrene monomers.

7. The tire according to claim 1, wherein the thermoplastic styrene blocks of each branched thermoplastic elastomer represent from 20% to 50% by weight of the weight of each branched thermoplastic elastomer.

8. The tire according to claim 1, wherein the one or more branched thermoplastic elastomers represent from 70 to 100 phr of the polymer composition.

9. The tire according to claim 1, wherein the one or more branched thermoplastic elastomers represent 100 phr of the polymer composition.

10. The tire according to claim 1, wherein each thermoplastic styrene polymer consists of more than 75% by weight of units derived from one or more styrene monomers.

11. The tire according to claim 7, wherein the styrene monomer of the thermoplastic styrene blocks is styrene.

12. The tire according to claim 11, wherein the styrene monomer of the one or more thermoplastic styrene polymers is styrene.

13. The tire according to claim 1, wherein the one or more thermoplastic styrene polymers represent from 15 to 85 phr of the polymer composition.

14. The tire according to claim 1, wherein the one or more thermoplastic styrene polymers represent from 50 to 85 phr of the polymer composition and have a weight-average molecular mass (Mw) of between 50,000 and 100,000 g/mol.

15. The tire according to claim 1, wherein the one or more thermoplastic styrene polymers represent from 15 to 50 phr of the polymer composition and have a weight-average molecular mass (Mw) of between 120,000 and 200,000 g/mol.

16. The tire according to claim 1 further comprising a crosslinking system selected from vulcanization systems and crosslinking systems based on one or more peroxides.

17. The tire according to claim 1, wherein the polymer composition is crosslinked by means of electron bombardment.

18. The tire according to claim 1, wherein the thermoplastic styrene blocks of each branched thermoplastic elastomer represent from 15% to 50% by weight of the weight of each branched thermoplastic elastomer, and wherein the one or more thermoplastic styrene polymers have a weight-average molecular mass (Mw) of between 50,000 and 200,000 g/mol.

19. The tire according to claim 1 comprising a tread comprising the polymer composition.

* * * * *